Jan. 21, 1930.  J. L. CREVELING  1,744,296
ELECTRIC SYSTEM
Original Filed Dec. 7, 1925
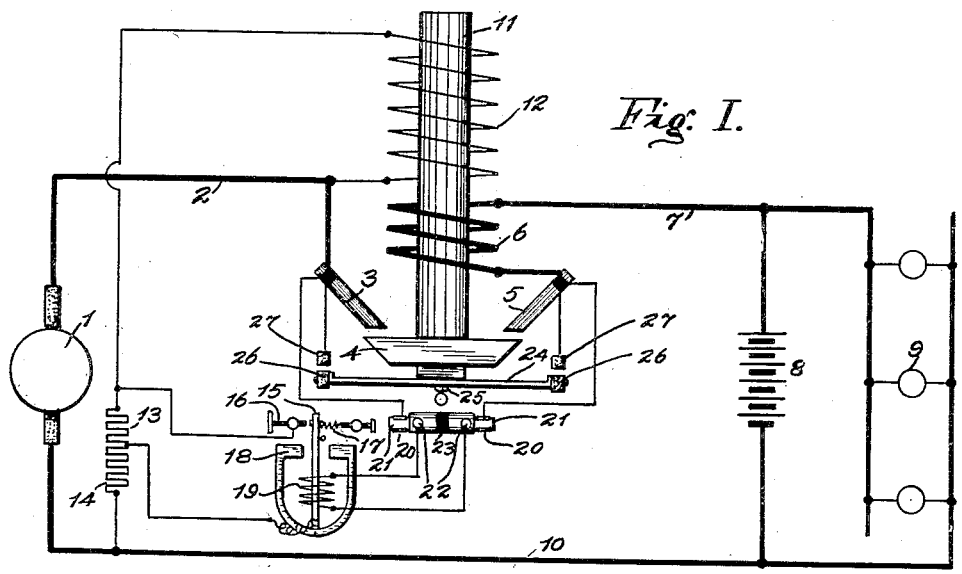
Fig. I.
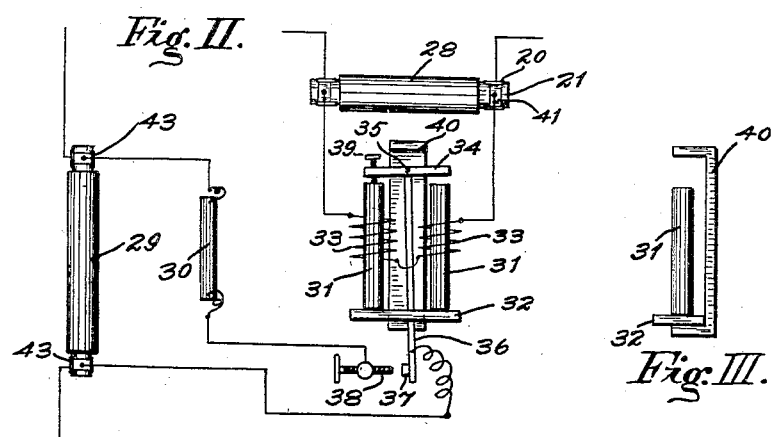
Fig. II.
Fig. III.
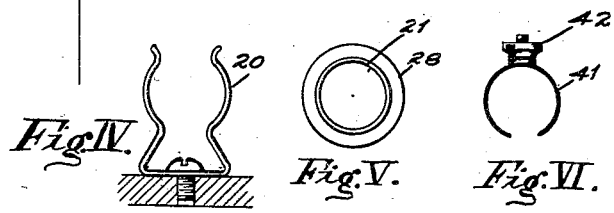
Fig. IV.   Fig. V.   Fig. VI.
INVENTOR:
John L. Creveling Patented Jan. 21, 1930

1,744,296

UNITED STATES PATENT OFFICE

JOHN L. CREVELING, OF NEAR TUCSON, ARIZONA, ASSIGNOR, BY MESNE ASSIGNMENTS, TO SIMPLEX EQUIPMENT COMPANY, INC., OF NEW YORK, N. Y., A CORPORATION OF DELAWARE

ELECTRIC SYSTEM

Application filed December 7, 1925, Serial No. 73,539. Renewed June 5, 1929.

My invention pertains to that class of electric systems wherein a dynamo or generator is used to charge a storage battery and operate lamps or other translating devices which are supplied by the battery when the dynamo is inoperative. As such systems are particularly applicable for the lighting of railway cars where the dynamo is driven at variable speed and subjected to stopping and starting, my invention will be described with particular reference to such a carlighting system.

In the drawing, Fig. I is a diagrammatic representation of one type of system comprehending the elements of my invention;

Fig. II is a diagrammatic representation of a modified portion of a system similar to that shown in Fig. I;

Fig. III is a side elevation of part of the structure illustrated in Fig. II;

Figs. IV, V, VI, are elevations of portions of the instrumentalities shown particularly in Fig. II.

The principal object of my invention is to provide automatic means for connecting the generator with the storage battery when their electromotive forces are substantially equal and as nearly as possible exactly equal, and to disconnect the generator from the battery when the electromotive force of the generator is very slightly below that of the battery so as to prevent more than a negligible back discharge from the battery therethrough.

It is a further object of my invention that the generator shall be connected with and disconnected from the battery in the proper manner throughout a considerable change in battery voltage which, in practice, is more or less variable within certain reasonably wide limits, which may depend upon the condition of charge of the battery. In many practical operating systems in use to-day, the voltage at which it is desirable to connect the generator and the battery varies from 28 to 40 volts, or thereabouts.

Referring particularly to Fig. I, 1 represents a dynamo or generator which may be of any suitable type as ordinarily used for the lighting of a railway car, it being understood that the generator is provided with a proper regulating means to compensate for reversals in direction of rotation and for speed changes in such manner that the generator is suitable for charging the storage battery and maintaining the lamps or other translating devices whenever its speed is above a predetermined value. As such generators, together with their regulating devices, are now common articles of commerce and well-known in the art, details, further than the mere diagrammatic representation of such a machine, are omitted for the sake of simplicity and clearness in illustration.

The dynamo 1 has its positive brush connected as by wire 2 with the flexible brush 3 adapted to make contact with the conducting member 4 when said member 4 is sufficiently raised. 5 is a flexible brush similar to that shown at 3 and connected through the solenoid 6 with the wire 7 which is carried to the positive side of the storage battery 8 and the positive side of the lamps or other translating devices indicated at 9,—return from the translating devices 9 and the battery 8 being made to the generator through the wire 10. 11 is a core of iron or other magnetic material within the solenoid 6 and united to the conducting member 4 in such manner as to lift the same into contact with the brushes 3 and 5 when the core 11 is sufficiently raised. 12 is a voltage coil or winding surrounding the core 11 and tending when energized to lift the same and cause contact between 3, 4 and 5. The coil 12 is connected, as indicated, in shunt across the generator leads, and has in series therewith a resistance comprising portions 13 and 14, the portion 13 of which may be shunted out when the lever 15 make contact with the adjustable screw 16, which contact is normally broken by the action of spring 17. The members 15—16—17 form parts of a polarized relay which may be provided with a permanent field magnet 18 and an actuating winding 19 which may be connected in shunt across the brushes 3 and 5, as by means of the clips 20 engaging the conducting ferrules 21 in electrical connection with the binding posts 22, electrically separated from each other as by insulation at 23. The member 4 carries the flexible member 24 which may be electrically connected therewith as by means of the screw 25. The member 24 is provided at each end with the carbon blocks 26, adapted when the core 11 is raised to make contact with the carbon blocks 27 before contact is established at 3—4—5. While the carbon contacts 26—27 are not really necessary in my improved system, they are here shown because they are present in a great number of systems now in use which employ also the brushes 3 and 5 which are connected by a contact 4, raised by a core 11 through the instrumentality of a coil 12 and cooperating with a coil 6, all as illustrated sufficiently in Fig. I in a more or less diagrammatic manner. And it is one of the objects of my invention that I may so alter these systems now in service that the generator and battery will be connected and disconnected at more nearly equal voltages throughout changes in voltage of the storage battery than is possible in these systems which my invention makes to improve. Many of these systems now in use employ a high resistance in shunt across the brushes 3 and 5, so that while the generator is disconnected from the battery a very small current will flow through this high resistance from the battery through the generator to insure the proper "building up" of the generator when it starts from a condition of rest. This resistance is usually in the form of a cylindrical "unit" having conducting ferrules at each end for inserting the same into the circuit. Usually, spring clips, as shown at 20 in Fig. I, are employed, one of said clips being shown in elevation in Fig. IV. These clips are connected with the brushes 3 and 5, as indicated in Fig. I. The resistance unit which is snapped into these clips is shown in side elevation at 28 in Fig. II, each end being provided with a ferrule 21 connected with one end of the resistance wire within the unit 28, an end elevation of one of said resistance units being shown in Fig. V. Most of these systems in use, moreover, have a resistance in series with the coil 12 which is employed for overcoming the effect of temperature changes in coil 12, due to the current flowing therein, in a manner now well-known in the art. In the usual systems, when the voltage across the generator reaches a predetermined value, coil 12 connects the battery and generator through 3—4—5, regardless of the voltage of the battery; and, as this connecting voltage is usually chosen at or very slightly below the normal working voltage of the battery 8, I replace the resistance in series with the coil 12 with one of a somewhat higher value, or merely add another resistance in series with it so as to increase the necessary generator voltage to cause the contact 3—4—5 to be made, to the maximum voltage apt to be attained by the storage battery under any condition of its normal operation, or even a little higher than this. Then, I divide this resistance into suitable parts, as indicated at 13 and 14, and connect the relay contacts 15—16 across the portion 13, the value of 13 being such that when contact at 15—16 is made the shunting out of the resistance 13 will cause the coil 12 to close the contact 3—4—5 at the minimum generator voltage at which it is ever desired to connect the generator and battery. Of course, instead of shunting out a portion of the resistance, as shown in Fig. I, a resistance unit may be used, as shown at 29 in Fig. II, so proportioned that when it is in series with the coil 12 the contact 3—4—5 will be made, when the voltage across the generator reaches the maximum value which may be attained by the battery in operation, or even some higher point. And, there may be placed around this a shunt resistance unit 30, as indicated in Fig. II, which when connected around 29 will reduce the value of resistance in series with the coil 12 so as to cause it to close contact 3—4—5 when the generator reaches the lowest value of voltage at which it is desired that the generator should be connected with the battery. It is obvious that the resistances 13—15 may be in the form of a unit having its ends connected to ferrules, as shown at 21 in Fig. V, and that a tap may be taken off at any suitable point, as indicated by the junction of 13 and 14 in Fig. I, and that such a unit with a tap may be substituted bodily in the clips usually used in service and similar to the one shown in Fig. IV for carrying resistance units in the usual systems, as indicated at 43 in Fig. II.

In Fig. II, I have shown another type of relay comprising two cores 31, of soft iron, carried by a soft iron yoke 32. These are surrounded by coils 33 and form an electromagnet having an armature or keeper 34 pivotally supported above the poles of the said magnet, as indicated at 35. This keeper is provided with a downwardly extending lever 36, preferably of aluminum or other very light material, and is provided with a contact point 37, adapted to come into contact with the adjustable screw 38 and limit the approach of the right-hand end of the keeper 34 toward its corresponding pole-piece. The left-hand end of the keeper 34 is provided with an adjustable screw 39 limiting the approach of this end of the keeper toward its pole-piece. The lever 36 is free to operate within the desired limits through an opening in the yoke 32. 40 is a permanent magnet connected at one end to the yoke 32 and having its other end or pole-piece extending over the top of the keeper 34 and magnet cores 31, as shown in side elevation in Fig. III. While I may so wind and proportion the coils 33 of Fig. II, or the coil 19 of Fig. I, that, if they are connected across the brushes 3 and 5 in place of the usual high resistance unit, as they are indicated as connected in Fig. I, they will serve in place of the resistance unit which may be removed from the usual systems, I find that with these relays (particularly the type shown in Fig. II) I can make them operate so delicately that they may be used simply in shunt across the usual high resistance indicated at 28 in Fig. II, without appreciably altering the operation or function of the usual resistance 28. Therefore, I find it convenient to use a clip similar to that shown in end elevation in Fig. VI, where a spring portion 41 carries a binding post 42.

For convenience in applying my invention to systems in use, I provide the winding 33 of the relay of Fig. II, for example, with flexible leads, each of which is connected with a binding post 42. Then, to place the relay in circuit, I merely withdraw the usual resistance unit 28 from the clips 20, snap the spring 41 over the ends of the proper ferrules and, the spring 41 being very thin, I press the unit 28 back into the clips 20 again, in its usual position, and the relay is connected across the same.

I find it also convenient, where a resistance 29, as shown in Fig. II is used, and a shunt 30 is to be used around it, to connect this shunt by means of the device shown in Fig. VI, as it is indicated as connected in Fig. II.

An operation of my invention, referring particularly to Fig. I, is as follows: If the generator be at rest or running at sufficiently low speed, the contacts 3—4—5, 26—27, and 15—16 will be open and the various parts will be in the positions shown in the drawing. Under these conditions, the translating devices 9 may be supplied by the battery in a well-known manner, and a very slight current will flow from the battery through coil 6 to brush 5 and to right-hand clip 20 and coil 19; then to left-hand clip 20, brush 3 and wire 2; return being made through the wire 10. I so arrange the winding 19 that this current will cause the armature 15 to be held against its stop, and the contact 15—16 will therefore remain open so long as this current flowing in this direction continues. If the generator speed be brought up until it is very near the voltage upon the battery, the current flowing through the coil 12 and the resistances 13—14 will exert a considerable pull upon the core 11, but will not be able to lift the same unless the battery be at the maximum voltage which may be reached by the generator and the resistance 13—14 so proportioned that coil 12 will raise the core 11 at this point, in which event the voltage of the generator and battery would be equal. However, if the resistance 13—14 be so adjusted that the core 11 will never be raised at any voltage which the generator 1 may attain, so long as the total current in coil 12 has to pass through the resistances 13—14 in series, the contact 3—4—5 will never be closed without some increase in the current in the coil 12, as for example that brought about by shunting out the resistance 13. When the generator voltage becomes equal to the battery voltage, coil 12, with the resistances 13—14 in series, will not be able to close the contact 3—4—5; but, as soon as the generator voltage equals the battery voltage, there will be no current flowing in the coil 19, and upon an exceedingly small increase in voltage of the generator over that of the battery a reverse current will flow in 19 tending to close the contact 15—16 against the action of spring 17, if such be employed. And I so arrange this relay that the reversal of current in coil 19 will cause the contact at 15—16 to be completed upon an extremely small current in 19 incident to a very small excess in generator voltage above that of the battery, either by employing a very delicate spring, as indicated at 17, or by simply making the armature 15 biased in a right-hand direction, as for example by merely having a lesser airgap between it and the pole-piece of the magnet 18 on the right-hand side than the airgap on the left-hand side. With either of these arrangements, as soon as the generator slightly exceeds the battery in voltage which, in practice, may only be a fraction of a volt, the contact 15—16 is made and the resistance 13 shunted out, whereupon coil 12 immediately closes the contact 3—4—5 and connects the generator with the battery. The closing of the contact 3—4—5 shunts out the coil 19 and the lever 15 returns to the position shown in the drawing, inserting the resistance 13; and now coil 12 is capable of holding the contact 3—4—5 made since it is assisted, when the generator is supplying any appreciable current, by the coil 6, as it requires less current in the coil 12 to hold the contact 3—4—5 made than is required to lift the core 11 and make the contact. However, the insertion of the resistance 13 so weakens the coil 12 that a very slight back discharge from the battery to the generator, through the coil 6, causes the contact 3—4—5 to be opened and the generator at once disconnected. If the speed increase again, the above outlined cycle will be repeated.

It will be noted that while I have described the lever 15 as biased in such direction as to tend to open the contact 15—16, my invention may be employed with the lever 15 biased in the opposite direction so as to tend to hold the contact 15—16 closed, in such manner that when the voltage of the generator and battery become equal 15 will make contact with 16 and connect the generator and battery, if such an adjustment be desired. Or, the lever 15 may be so arranged as to tend to remain in either of its extreme positions toward the right or left, whichever it may be placed in; that is, biased in either direction depending upon which side of the center it happens to be. With this adjustment, a slight increase in generator voltage above the battery will be required to close the contact 3—4—5, and a slight back discharge through coil 19 will be required to open the contact 15—16.

If that modification shown in Fig. II be employed, the operation may be readily followed from the above description with respect to Fig. I, it merely being noted that the relay, by closing the contacts 37—38, throws a shunt 30 around the resistance 29, so as to cause the coil 12 to lift the core 11 and close contact 3—4—5 at once when the contact 37—38 is made. With this type of relay and the usual resistance 28 in the system with the relay in shunt thereto, I am able to make the coil 12 close the contact 3—4—5 when the generator voltage is so slightly above that of the battery that, for all practical purposes, the voltage of each may be considered equal. And, with the devices as shown in Figs. IV and V and VI, these relays are very easily connected in many of the types of systems now in use, as above pointed out, and cause the same to so operate that the generator and battery are connected and disconnected with a substantially inappreciable difference in voltage between them, causing no perceptible fluctuation in the illuminating power of the lamps during the connecting and disconnecting of the generator therefrom.

I do not wish in any way to limit myself to any of the details of construction or modes of operation herein given to illustrate an embodiment of my invention, for it will be obvious that wide departure in the way of details, both in construction and operation, may be made without departing from the spirit and scope of my invention which is as set forth in the following claims:

I claim:

1. The combination with a generator, a storage battery charged thereby and means controlling the connection of the generator and said battery including an operating coil in shunt across the generator, of means for varying the value of the current in said coil while so connected in shunt comprising a voltage coil in shunt around the connecting means, and means operated thereby for controlling the current in the operating coil to cause said operating coil to control the connection.

2. The combination with a generator, a storage battery charged thereby, means for connecting and disconnecting the generator and battery including an operating coil responsive to a predetermined value of generator voltage and means for varying the effect of generator voltage thereupon, of means for controlling said last-named means comprehending a high resistance voltage coil permanently connecting the generator and battery.

3. The combination with a generator, a storage battery charged thereby and automatic means for connecting and disconnecting the generator and said battery including operating means, of means for controlling the operation of said operating means comprising means for varying the resistance in circuit with the operating means and means for controlling said varying means operated by a winding connected in shunt around the connecting means.

4. The combination with a generator, a circuit including a storage battery, automatic means for opening and closing said circuit and means electrically connected with and affecting the circuit opening and closing means, of means for controlling the said thus connected means, means for operating the controlling means and means whereby the same may be readily connected around contacts comprised in the circuit opening and closing means.

5. The combination with a generator, a storage battery charged thereby and automatic means for connecting and disconnecting the generator and said battery including operating means, of means for controlling the operation of said operating means comprising means comprising means for varying the resistance in circuit with the operating means to cause said operating means to make said connection including a readily attachable shunt, means for controlling said varying means comprising a winding and means whereby said winding may be readily connected in shunt around the connecting means.

6. The combination with a generator, storage battery, and means for connecting and disconnecting the same including an operating coil having a resistance in circuit therewith, of means for varying the effective resistance in said circuit including circuit controlling means and operating means therefor operated by a coil in shunt to the generator and battery connection.

7. The combination with a generator, a storage battery, and means for connecting and disconnecting the same including an operating coil having a resistance in circuit therewith and means for varying the effective value of said resistance, a permanent connection between the generator and battery containing a resistance element and means comprising a coil connected across said element for controlling said varying means.

8. The combination with a variable speed generator, a storage battery charged thereby and an automatic switch adapted to connect the generator and battery at a predetermined generator voltage, of external means for controlling the operation of said switch comprehending a coil across the break caused by said switch.

9. The combination with a generator, a storage battery charged thereby and automatic means for connecting and disconnecting the generator and said battery comprehending a coil in shunt to the generator tending to cause such connection, of means for affecting the energization of said coil comprising an independent coil in shunt around said connection.

10. The combination with a generator, a storage battery charged thereby and means for connecting said generator and said battery comprehending a coil deriving current from the generator whenever operative, of a coil for affecting the energization of said first-mentioned coil traversed by current from the battery to the generator under certain conditions and by current from the generator to the battery under other conditions.

11. The combination with a generator, a storage battery charged thereby and means for connecting said generator and said battery comprehending a coil deriving current from the generator whenever operative, of a coil for affecting the current in said first-mentioned coil traversed by current from the battery to the generator when the battery voltage exceeds that of the generator and by current from the generator to the battery when the generator voltage exceeds that of the battery.

12. The combination with a generator and a storage battery charged thereby, of means for connecting said generator and said battery comprehending a voltage coil permanently across the generator, a voltage coil in shunt around the point of said connection between the generator and battery and means operated thereby for affecting the current in said first-mentioned voltage coil.

13. The combination with a generator and storage battery charged thereby, automatic circuit-manipulating means controlling the connection of the generator with said battery including a coil always receiving current from the generator when operative for operating said circuit-manipulating means, and means for controlling the operation of said manipulating means comprehending a high resistance winding permanently in shunt around a portion of said manipulating means.

14. The combination with a generator and a storage battery charged thereby and automatic circuit-manipulating means controlling the connection of the generator with said battery having a coil permanently in shunt relation to the generator for operating said circuit-manipulating means, of means for controlling the operation of said manipulating means comprehending a high resistance winding permanently in shunt around a portion of said manipulating means, and means operated by said shunt winding for controlling the operating coil.

15. The combination with a generator, a storage battery charged thereby and automatic means for making and breaking the connection between the generator and the battery including operating means functionally affected by variations in generator voltage, of means for controlling the effective voltage upon said operating means comprising a high resistance coil permanently connecting the battery and generator.

16. The combination with a generator, a storage battery charged thereby and automatic means for making and breaking the connection between the generator and the battery including operating means functionally affected by the value of generator voltage, of means for controlling the operation of said operating means comprising a high resistance coil permanently connecting the battery and generator and means operated by said high resistance coil for controlling the voltage upon the operating coil.

JOHN L. CREVELING.